Patented Oct. 15, 1946

2,409,247

UNITED STATES PATENT OFFICE 2,409,247

POLYMERIZATION PROCESS

John W. Brooks, Wenonah, and Arlie A. O'Kelly, Woodbury, N. J., and Robert H. Work, Philadelphia, Pa., assignors to Socony-Vacuum Oil Company, Incorporated, a corporation of New York No Drawing. Application December 30, 1943, Serial No. 516,243

7 Claims. (Cl. 260—683.15)

This invention relates to the polymerization of hydrocarbons, and is more particularly concerned with the provision of a catalyst suitable for catalyzing the polymerization of hydrocarbons.

It is well known in the art, to effect a union between molecules of an unsaturated hydrocarbon to produce a compound, called a polymer, the molecular weight of which, is an even multiple of the molecular weight of the original hydrocarbon. The operation is called polymerization and the conditions of temperature, pressure, etc., are called polymerizing conditions. Under suitable conditions, the union may also take place among molecules of two or more different unsaturated hydrocarbons, to produce compounds that represent additions of the two or more hydrocarbons. The compounds thus produced are referred to as copolymers as distinguished from the compounds obtained when unsaturated hydrocarbons condense with themselves, and the operation is called copolymerization. In the interest of brevity, polymerization and copolymerization will be referred to hereinafter, broadly as polymerization, and the conditions of temperature, pressure, etc., will be referred to, accordingly, as polymerizing conditions, it being clearly understood, that the nature of the union will become apparent to those versed in the art, from the character of the reactants used in any particular reaction.

As is well known to those familiar with the art, polymerization reactions of the type referred to hereinbefore, may be conducted at relatively high temperatures and pressures; or may be carried out at lower temperatures and pressures, in the presence of substances or of mixtures of substances, that facilitate the polymerization reaction. These substances are referred to as polymerization catalysts or copolymerization catalysts, depending on the type of reaction they catalyze; or in keeping with the terminology established herein, they may be referred to broadly, as polymerization catalysts. Several substances have been proposed as polymerization catalysts, and among the most widely used are phosphoric acid, sulfuric acid, hydrogen fluoride, aluminum chloride and boron trifluoride.

We have now found that the mixture resulting from the action of anhydrous hydrogen fluoride on phosphorus pentoxide is an effective polymerization catalyst.

It is an object of the present invention to provide a process for catalytically effecting the polymerization of unsaturated hydrocarbons. Another object is to provide an efficient process for catalytically polymerizing olefinic hydrocarbons. A very important object of the present invention is to afford a process capable of carrying out the above objects by using a new polymerization catalyst. A more specific object is to provide a new polymerization catalyst that can be readily and efficiently prepared. Other objects and advantages of the present invention will become apparent to those skilled in the art from the following description.

Broadly stated, the present invention provides a process for effecting the polymerization of olefinic hydrocarbons, which comprises contacting the reactants in a reaction zone under polymerization conditions, with the mixture resulting from the action of anhydrous hydrogen fluoride on phosphorus pentoxide.

The new polymerization catalyst of our invention, therefore, is the mixture of reaction products obtained by reacting anhydrous hydrofluoric acid with phosphorus pentoxide. The reaction produces what is believed to be a mixture of phosphoryl fluoride and metaphosphoric acid, and is believed to proceed in accordance with the following equation:

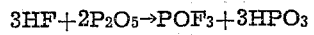

$$3HF + 2P_2O_5 \rightarrow POF_3 + 3HPO_3$$

The reaction may be carried out in a number of ways, but our preferred procedure is to pass anhydrous hydrofluoric acid into phosphorus pentoxide. Since much heat is evolved during the ensuing reaction, it is necessary to cool and stir the mixture well during the addition of the hydrogen fluoride. The addition of a saturated hydrocarbon or of a mixture of saturated hydrocarbons to the phosphorus pentoxide, before the addition of hydrogen fluoride, aids in the preparation of the catalytic mixture. The hydrocarbon or hydrocarbon mixture forms a layer over the phosphorus pentoxide thereby preventing contact between the phosphorus pentoxide and the moisture in the ambient atmosphere, whereby, formation of hard aggregates is eliminated and stirring is facilitated.

The amounts of the catalytic mixture used in our process, vary between about 5% and about 50%, with respect to the weight of the hydrocarbon reactants in the charge. Larger amounts may be used, if desired, although no additional advantages seem to result therefrom.

The catalytic mixture resulting from the reaction between anhydrous hydrogen fluoride and phosphorus pentoxide may be used to catalyze reactions involving polymerization or copolymerization of normally gaseous olefinic hydrocarbons, propene, butenes and pentenes, to produce polymers or copolymers, that boil within the boiling range of motor fuels. These products are highly desirable in view of their high octane ratings, and accordingly, the use of our catalytic mixture in the polymerization processes for manufacturing high octane motor fuels, must be considered a preferred embodiment of our invention.

The olefinic hydrocarbons to be used in our process may be derived from any suitable source, as is well known in the art. A conventional and preferred source of the hydrocarbons used in the preferred operation of manufacturing motor fuels, is the fixed gases obtained around petroleum refineries, as is well understood in the art. These hydrocarbons may be used either in the pure state or in admixture with other constituents not undesirable. In this connection, it must be noted that when the polymerization reaction involves for example, polymerization or copolymerization of the normally gaseous olefinic hydrocarbons in the preferred embodiment of our invention, the manufacture of motor fuels, under the polymerizing conditions extant in the reaction zone and in the presence of our catalytic mixture, it is difficult to control the degree of polymerization or copolymerization, with the result that the product obtained contains large amounts of polymers and copolymers, that have boiling points outside the boiling range of motor fuels.

We have found also, that the degree of polymerization or of copolymerization of the olefinic hydrocarbons in the presence of our novel polymerization catalyst, may be controlled through the use of a saturated hydrocarbon diluent, thereby insuring a product that will contain predominantly, constituents that boil within the boiling range of motor fuels. Accordingly, the charge stock of our process may consist of a refinery $C_4$-cut, containing 44% isobutene, 13.4% 1- and 2-butenes, 1% propene, and the balance mainly normal butane and isobutane. In general, compounds or mixtures of compounds that are inert under the polymerizing conditions of our process, and that can be easily separated and removed from the product, if desired, are suitable diluents. Accordingly, paraffinic hydrocarbons have been found to be very effective diluents of this type. Paraffinic hydrocarbons that are suitable diluents in the preferred embodiment of our invention, i. e., the manufacture of motor fuels, comprise propane, normal butane, isobutane, normal pentane and isopentane, and mixture thereof. It must be understood, of course, that paraffinic hydrocarbons such as hexane, heptane, octane and the like, may be used if desired; however, and by way of example, if the product contains $C_7$-olefinic hydrocarbons, the diluent, if heptane, can be separated and removed therefrom with difficulty. On the other hand, if not objectionable, the diluent or diluents may be left in the product. In commercial applications of our process, the charge stock containing the olefinic hydrocarbons to be polymerized or copolymerized, may contain also the necessary diluent or diluents. Thus, in a charge stock containing light olefinic hydrocarbons and higher paraffinic hydrocarbons, the higher paraffinic hydrocarbons will act as the diluent and if not objectionable for the intended use of the product of the polymerization operation, may be left in the product.

It must be observed, that the desirable effect produced through the use of these diluents, is not to be attributed to an alkylation reaction between the diluents and the olefinic hydrocarbons involved in the polymerization operation. The relatively low temperatures used in our process, and the relatively high iodine number of the products obtained, are proof that very little alkylation, if any, occurs.

The amount of saturated hydrocarbon diluent used, ordinarily varies between about 50% and about 95%, with respect to the weight of the olefinic hydrocarbons in the charge.

In our process, the polymerization operation may be carried out in several ways. For example, when the reaction involves copolymerization, one of the olefinic reactants may be pumped into a mixture of the catalytic mixture, the other olefinic reactant, and a saturated hydrocarbon diluent, where desirable; or, a mixture of the olefinic reactants may be pumped into a mixture of our catalytic mixture and a mixture of saturated hydrocarbon diluents; or, a mixture of the olefinic reactants and diluent may be pumped into a reaction zone containing the catalytic mixture.

In the process of our invention, the temperature to be used usually varies between about 0° C. and about 60° C., and preferably, between about 18° C. and about 30° C. The pressure to be employed depends upon the temperature used, and ordinarily, a pressure sufficient to maintain the reactants in the liquid phase at the temperature employed, is adequate. The reaction period, whether the condensation operation involves polymerization or copolymerization, depends, of course, upon the temperature, and to a certain extent, upon the pressure. Ordinarily, a reaction period varying between about one minute and 30 minutes is satisfactory.

It must be understood, of course, that the reaction variables are more or less interdependent, hence, when one is arbitrarily fixed, the limits within which the others may be varied are somewhat restricted. In any particular instance, the most desirable conditions can be readily ascertained by one skilled in the art, the working ranges of these variables in the preferred operation of our process for the manufacture of motor fuels, having been indicated hereinbefore.

Numerous experimental data could be adduced to indicate the results obtainable in accordance with the process of the present invention, but the following runs are sufficiently characteristic:

Example 1

A mixture of 300 grams of mixed amylenes and 200 grams of catalytic mixture was placed in an autoclave and stirred. The temperature of the mixture increased rapidly and could not be controlled. The product consisted predominantly, of high-boiling unsaturated hydrocarbons.

Example 2

300 grams of mixed amylenes were pumped over a period of one hour, into an autoclave containing a mixture of 1206 grams of isobutane and 200 grams of catalytic mixture, while the mixture was being stirred. Stirring was continued for 30 minutes after the amylene was added. The temperature of the reaction was kept at 18° C.–24° C. The debutanized product weighed 300 grams. 5% of the debutanized product boiled below 41° C., 85% boiled between 41° C. and 210° C., and 15% above 210° C. The iodine number of the fraction boiling between 41° C. and 210° C. was about 200 and had an octane number of 97.2, by the research method.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process of polymerizing olefinic hydrocarbons, which comprises establishing a reaction zone; reacting outside said reaction zone, anhydrous hydrofluoric acid with phosphorus pentoxide, to yield a reaction mixture; and contacting olefinic hydrocarbons with said reaction mixture, in said reaction zone under polymerizing conditions including temperatures varying between about 0° and about 60° C.

2. The process of polymerizing olefinic hydrocarbons, which comprises establishing a reaction zone; reacting outside said reaction zone, anhydrous hydrofluoric acid with phosphorus pentoxide, to yield a reaction mixture; and contacting olefinic hydrocarbons with said reaction mixture, in said reaction zone under polymerizing conditions including temperatures varying between about 18° C. and about 30° C.

3. The process of manufacturing high-octane motor fuel, which comprises establishing a reaction zone; reacting outside said reaction zone, anhydrous hydrofluoric acid with phosphorus pentoxide, to yield a reaction mixture; and contacting normally gaseous olefinic hydrocarbons with said reaction mixture, in the presence of paraffinic hydrocarbon material, in said reaction zone under polymerizing conditions including temperatures varying between about 0° C. and about 60° C.

4. The process of manufacturing high-octane motor fuel, which comprises establishing a reaction zone; reacting outside said reaction zone, anhydrous hydrofluoric acid with phosphorus pentoxide, to yield a reaction mixture; and contacting normally gaseous olefinic hydrocarbons with said reaction mixture, in the presence of paraffinic hydrocarbon material, in said reaction zone under polymerizing conditions including temperatures varying between about 18° C. and about 30° C.

5. The process of manufacturing high-octane motor fuel, which comprises establishing a reaction zone; reacting outside said reaction zone, anhydrous hydrofluoric acid with phosphorus pentoxide, to yield a reaction mixture; and contacting normally gaseous olefinic hydrocarbons with said reaction mixture, in the presence of paraffinic hydrocarbon material selected from the group consisting of propane, butane, pentane, isobutane and isopentane, in said reaction zone under polymerizing conditions including temperatures varying between about 0° C. and about 60° C.

6. The process of manufacturing high-octane motor fuel, which comprises establishing a reaction zone; reacting outside said reaction zone, anhydrous hydrofluoric acid with phosphorus pentoxide, to yield a reaction mixture; and contacting normally gaseous olefinic hydrocarbons with said reaction mixture, in the presence of paraffinic hydrocarbon material selected from the group consisting of propane, butane, pentane, isobutane and isopentane, in said reaction zone under polymerizing conditions including temperatures varying between about 18° C. and about 30° C.

7. The process of manufacturing high-octane motor fuel, which comprises establishing a reaction zone; reacting outside said reaction zone, anhydrous hydrofluoric acid with phosphorus pentoxide, to yield a reaction mixture; and contacting a $C_4$-refinery cut with said reaction mixture, in said reaction zone under polymerizing conditions including temperatures varying between about 18° C. and about 30° C.

JOHN W. BROOKS.
ARLIE A. O'KELLY.
ROBERT H. WORK.